United States Patent
Engskow et al.

(10) Patent No.: US 12,095,734 B1
(45) Date of Patent: Sep. 17, 2024

(54) CONTAINER-BASED ASSOCIATION AND SHARING OF DOMAIN NAME SYSTEM CONFIGURATION OBJECTS

(71) Applicant: Amazon Technologies, Inc., Seattle, WA (US)

(72) Inventors: Matthew Engskow, Alexandria, VA (US); Vikram Saurabh, Broadlands, VA (US); Yu Wang, Falls Church, VA (US); Huida Tao, Herndon, VA (US); Daniel Bradley, Sterling, VA (US); Bing Xia, Fairfax, VA (US); Mekias Mebrahtu Yohannes, Centreville, VA (US); Abhinav Punj, Reston, VA (US); Jeffrey J. Damick, South Riding, VA (US)

(73) Assignee: Amazon Technologies, Inc., Seattle, WA (US)

( * ) Notice: Subject to any disclaimer, the term of this patent is extended or adjusted under 35 U.S.C. 154(b) by 267 days.

(21) Appl. No.: 17/489,168

(22) Filed: Sep. 29, 2021

(51) Int. Cl.
  *G06F 21/00* (2013.01)
  *H04L 9/40* (2022.01)
  *H04L 61/4511* (2022.01)

(52) U.S. Cl.
  CPC ...... *H04L 63/0263* (2013.01); *H04L 61/4511* (2022.05); *H04L 63/0272* (2013.01)

(58) Field of Classification Search
  CPC ............. H04L 63/0263; H04L 61/4511; H04L 63/0272
  See application file for complete search history.

(56) References Cited

U.S. PATENT DOCUMENTS

| 10,719,369 B1 * | 7/2020 | Aithal ................. H04L 63/0263 |
| 2004/0078457 A1 * | 4/2004 | Tindal ................... H04L 41/085 709/238 |

(Continued)

FOREIGN PATENT DOCUMENTS

CN  109729189 A  *  5/2019

OTHER PUBLICATIONS

Resolving DNS queries between VPCs and your network, Amazon Web Services, https://docs.aws.amazon.com/Route53/latest/DeveloperGuide/resolver.html, web-archive capture from Jul. 15, 2021, accessed on Feb. 13, 2023 from https://web.archive.org/web/20210715130608/https://docs.aws.amazon.com/Route53/latest/DeveloperGuide/resolver.html; 6 pages.

(Continued)

*Primary Examiner* — Michael M Lee
(74) *Attorney, Agent, or Firm* — BakerHostetler

(57) ABSTRACT

A container may be created, and a plurality of domain name system (DNS) configuration objects may be added to the container. The plurality of DNS configuration objects may comprise at least one of private DNS zones, outbound forwarding rules, DNS query log configurations, and firewall rule groups. The container may be associated with a plurality of private logical networks. The container may also be across a plurality of customer accounts. Based on the plurality of DNS configuration objects, a plurality of DNS operations associated with the plurality of private logical networks may be performed. The plurality of DNS operations may comprise at least one of DNS query resolution, DNS query outbound forwarding, configuring a query log, or configuring a firewall.

20 Claims, 8 Drawing Sheets

(56) References Cited

U.S. PATENT DOCUMENTS

| | | | | |
|---|---|---|---|---|
| 2017/0124320 | A1* | 5/2017 | Fojtik | G06F 21/53 |
| 2017/0171146 | A1* | 6/2017 | Sharma | H04L 61/4511 |
| 2017/0201490 | A1* | 7/2017 | Kinder | H04L 63/0272 |
| 2018/0159821 | A1* | 6/2018 | Chanda | H04L 61/5014 |
| 2018/0336109 | A1* | 11/2018 | Huang | H04L 61/4511 |
| 2019/0081955 | A1* | 3/2019 | Chugtu | H04L 63/0236 |
| 2019/0158455 | A1* | 5/2019 | Hegde | H04L 61/5076 |
| 2019/0286832 | A1* | 9/2019 | Szeto | H04W 12/082 |
| 2021/0243164 | A1* | 8/2021 | Murray | H04L 61/4511 |

OTHER PUBLICATIONS

Resolving DNS queries between VPCs and your network, Amazon Web Services, https://docs.aws.amazon.com/Route53/latest/DeveloperGuide/resolver.html, web-archive capture from Aug. 12, 2021, accessed on Feb. 13, 2023 from https://web.archive.org/web/20210812033843/https://docs.aws.amazon.com/Route53/latest/DeveloperGuide/resolver.html; 6 pages.

Configuring Amazon Route 53 as your DNS service, Amazon Web Services, https://docs.aws.amazon.com/Route53/latest/DeveloperGuide/dns-configuring.html, web-archive capture from May 18, 2021, accessed on Feb. 13, 2023 from https://web.archive.org/web/20210518152002/https://docs.aws.amazon.com/Route53/latest/DeveloperGuide/dns-configuring.html; one page.

* cited by examiner

| Rule Priorities Table 500 | | | |
|---|---|---|---|
| DNS Query 511 | Container Private DNS Zone Rule 512 | Local Private DNS Zone Rule 513 | Evaluated Rule 514 |
| *foo.example* | *foo.example* | *foo.example* | *Local Private DNS Zone* |
| *specific.foo.example* | *specific.foo.example* | *foo.example* | *Container Private DNS Zone* |
| *specific.foo.example* | *None* | *specific.foo.example* | *Local Private DNS Zone* |

FIG. 5

CONTAINER-BASED ASSOCIATION AND SHARING OF DOMAIN NAME SYSTEM CONFIGURATION OBJECTS

BACKGROUND

A multi-tenant computing service provider may operate a multi-tenant hosted network. In some examples, customers (i.e., tenants) of the multi-tenant computing service provider may create private logical networks, which are logically isolated private networks within the multi-tenant hosted network. Customers may select ranges of Internet Protocol (IP) addresses for their private logical networks, and the private logical networks may allow customers to secure and monitor network connections, screen traffic, and restrict access to resources within the private logical networks. The customers may pay fees to the computing service provider for use and operation of the private logical networks. In addition to private logical networks, the multi-tenant computing service provider may allow customers to create various domain name system (DNS) configuration objects, such as private DNS zones, outbound forwarding rules, DNS query logging configurations, and firewall rule groups. Private DNS zones may allow a customer to create DNS query response settings for queries that are issued from within a private logical network. Outbound forwarding rules may allow a customer to create rules for forwarding queries for specified domain names from a private logical network to a specified destination (e.g., another customer network). DNS query logging rules may allow a customer to create rules for configuring DNS query logging operations. Firewall rule groups may allow a customer to create rules for defining a firewall's behavior.

BRIEF DESCRIPTION OF DRAWINGS

The following detailed description may be better understood when read in conjunction with the appended drawings. For the purposes of illustration, there are shown in the drawings example embodiments of various aspects of the disclosure: however, the invention is not limited to the specific methods and instrumentalities disclosed.

FIG. 5 is a diagram illustrating an example rule priorities table that may be used in accordance with the present disclosure.

DETAILED DESCRIPTION

Figure 1:
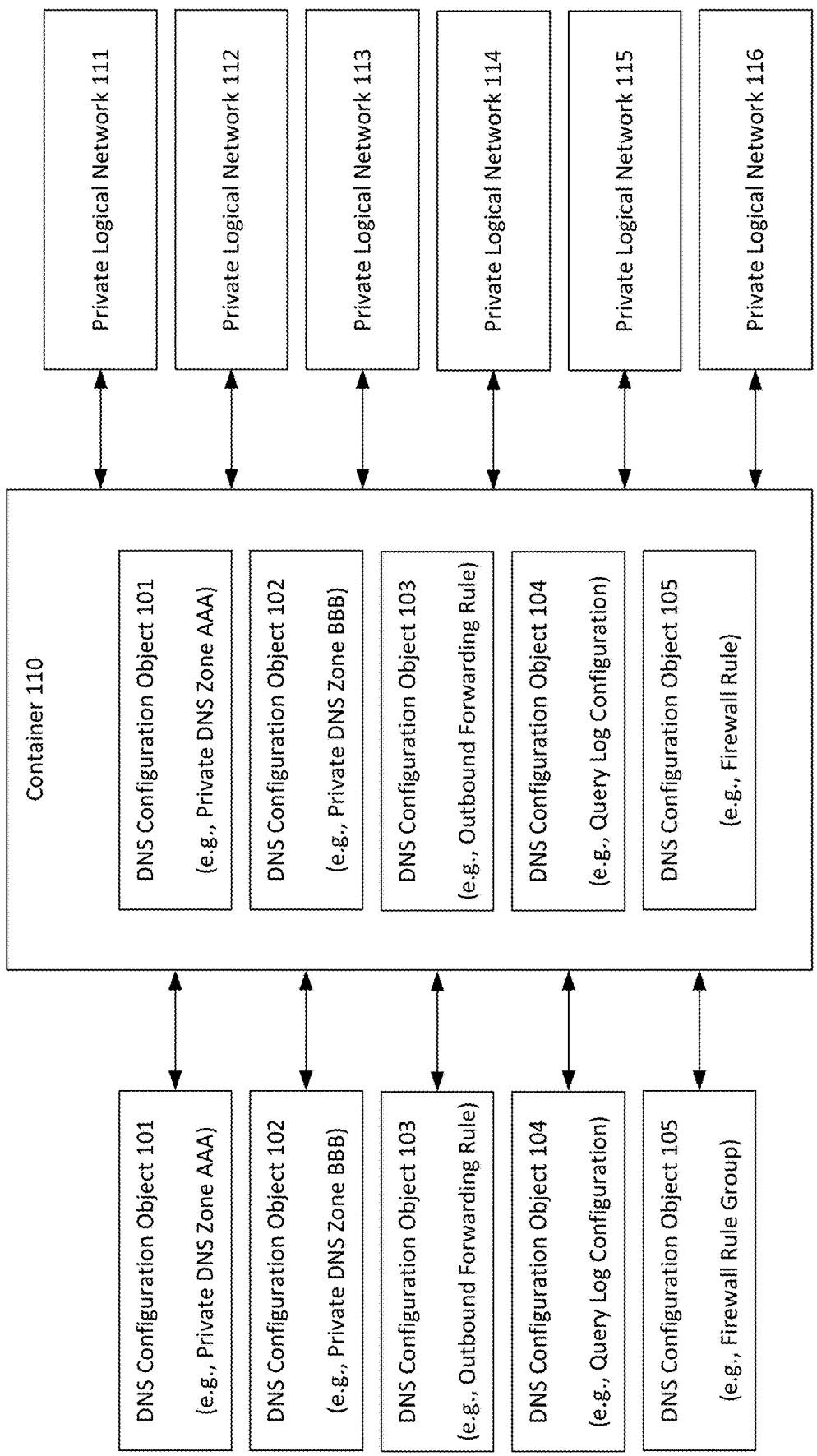
FIG. 1 is a diagram illustrating example container associations that may be used in accordance with the present disclosure.

Techniques for container-based association and sharing of domain name system (DNS) configuration objects are described herein. Specifically, as described herein, a customer of a multi-tenant computing service provider may provide instructions to create a container and to add of a plurality of DNS configuration objects to the container. The term container, as used herein, refers to a parent data object to which a plurality of child data objects (e.g., DNS configuration objects) may be added. DNS configuration objects may be added to the container by storing the DNS configuration objects in the container. If desired, the customer may also remove any, or all, of the DNS configuration objects from the container. A DNS configuration object may be removed from the container by deleting the DNS configuration object from the container.

The term DNS configuration object, as used herein, refers to a configurable object that is used to manage one or more DNS-related features. In some examples, the DNS objects that are added to a container may include private DNS zones, outbound forwarding rules, DNS query logging configurations, and firewall rule groups. Private DNS zones (e.g., private hosted zones) are collections of customer-configured DNS settings for responding to queries that are issued from within private logical networks. Outbound forwarding rules are customer-configured rules for forwarding queries for specified domain names from a private logical network to a specified destination (e.g., another customer network). Outbound forwarding rules may include forward rules and system rules. Forward rules are rules that specify a domain name for which outbound forwarding is desired. System rules are exceptions to a forward rule, such as exceptions for a given subdomain that is within a domain of a forward rule. DNS query logging configurations are customer-specified configurations for DNS query logging operations. Firewall rule groups are customer-configured groups of one or more rules for defining a firewall's behavior.

The customer may also provide instructions to associate a plurality of private logical networks with the container. The term private logical network, as used herein, refers to a logically isolated private customer network that is within a multi-tenant hosted network. A virtual private cloud is one example of a private logical network. By associating a private logical network with the container, each of the configuration objects that are associated with the container may, in turn, be associated with, and applied to, the private logical network. For example, the container's associated private DNS zones, outbound forwarding rules, DNS query logging configurations, and/or firewall rule groups may be applied to the private logical network.

One challenge related to the use of private logical networks is that, in some conventional systems, customers may be required to associate DNS configuration objects to private logical networks on an object-by-object basis. For example, if a customer has fifty DNS configuration objects that the customer wishes to associate to a first private logical network, the customer may be required to create, and manage, fifty associations between the fifty DNS configuration objects and the first private logical network. Additionally, if the customer also wishes to associate the same fifty DNS configuration objects to a second private logical network, the customer may be required to create, and manage, another fifty associations between the fifty DNS configuration objects and the second private logical network, thereby resulting in a combined total of one-hundred associations.

An additional fifty more associations may also be required for each additional private logical network to which the customer wishes to associate the same fifty DNS configuration objects. The creation and management of these large quantities of associations may be complicated, time-consuming and inefficient tasks.

In contrast to the conventional systems described above, the container described herein allows the customer to create and manage fewer associations. For example, according to the techniques described herein, the customer may add the fifty DNS configuration objects to a container. The customer may then associate the container with the first private logical network and the second private logical network. In this scenario, the customer makes a total of fifty-two associations, including fifty associations of the fifty DNS configuration objects with the container and two associations of the container with the first and the second private logical networks. Thus, the total number of associations required to apply the fifty configuration objects to the first and the second private logical networks is reduced from one-hundred to fifty-two. Moreover, to apply the fifty configuration objects to an additional private logical network, only one additional association is required (i.e., between the container and the additional private logical network), as opposed to fifty additional associations. Additionally, to make a change to one or more configuration objects, those changes may be made only once (to the container) and then propagated across each private logical network with which the container is associated.

Another benefit of the containers described herein is that they may be shared between (and optionally modified by) different customer accounts. This may allow the container to be used advantageously, for example, in scenarios when the container's associated private logical networks are housed across multiple accounts. Additionally, different permissions may optionally be assigned to different accounts, thereby limiting changes to the container that may be made by each account. In this manner, permissions may be used to control whether, and to what extents, the container may be modified by different customer accounts. For example, some accounts may be assigned full access to the container, while other accounts may be assigned read-only access. Moreover, in some cases, fine-grained permissions may be used for one or more accounts. For example, fine-grained permissions may be used to specify DNS names for which child accounts are permitted, and/or not permitted, to add private DNS zones and other DNS configuration objects to the container. As a specific example, fine-grained permissions may be used to allow members of a given business group to add, to the container, private DNS zones only for subdomains associated with that business group. Furthermore, permissions may also be used the control private DNS zones added to the container so that a customer can't add multiple private DNS zones with overlapping namespaces, which could cause DNS resolution conflicts.

Thus, the use of containers may reduce complexity and improve the efficiency and reliability of DNS configuration tasks. The use of the containers described herein may be particularly advantageous in scenarios when a customer wishes to apply large quantities of configuration objects to large quantities of private logical networks. For example, in many cases, a customer may have certain core configurations that the customer wish to apply to all, or almost all, of the customer's private logical networks, and the use of a container may be a highly efficient and reliable way to make and apply these core configurations.

Additionally, in some examples, containers may optionally be used in combination with traditional direct local associations between DNS configuration objects and private logical networks. A local DNS configuration object, as that term is used herein, refers to a DNS configuration object that is directly (i.e., not via a container) associated with a given private logical network. Moreover, in some examples, the computing service provider may employ a set of priorities for responding to requests that involve a conflict between a container configuration and a local configuration. For example, in some cases, when such a conflict occurs, the configuration (i.e., container or local) with the most specific applicable rule may be given priority. If both configurations are equally specific, then the local configuration may generally be given priority over the container configuration. These priorities may allow customers that are currently using local associations to gradually add, and migrate to, container associations without the fear that the container associations will result in errors or unexpected behaviors. For example, after associating a container to a private logical network, a customer may gradually disassociate each local configuration object one-by-one and test to verify that the container provides expected behavior (e.g., an intended DNS resolution is provided for the private logical network). This approach allows the customer to immediately rollback the container migration if unexpected behavior is encountered. Moreover, local associations may also continue to be used in combination with containers, such as to allow customers to create private logical network-specific configurations while still inheriting from a common shared DNS configuration collection in a container.

FIG. 1 is a diagram illustrating example container associations that may be used in accordance with the present disclosure. As shown in FIG. 1, a container 110 is created, for example by a customer of a multi-tenant computing service provider. In the example of FIG. 1, the customer has provided instructions to add DNS configuration objects 101-105 to the container 110. Upon receipt of these instructions, the multi-tenant computing service provider may add DNS configuration objects 101-105 to the container 110. The DNS configuration objects 101-105 may be added to the container 110 by storing the DNS configuration objects 101-105 within the container 110. In the example of FIG. 1, DNS configuration object 101 may be private DNS zone AAA, DNS configuration object 102 may be private DNS zone BBB, DNS configuration object 103 may be an outbound forwarding rule, DNS configuration object 104 may be a DNS query log configuration, and DNS configuration object 105 may be a firewall rule group.

As also shown in FIG. 1, the customer may provide instructions to associate private logical networks 111-116 with the container 110. Upon receipt of these instructions, the multi-tenant computing service provider may associate private logical networks 111-116 with the container 110. It is noted that the customer may have any number of additional private logical networks (not shown in FIG. 1), which the customer may elect not to associate with the container 110. By associating private logical networks 111-116 with the container 110, each of the DNS configuration objects 101-105 that are included in the container 110 may, in turn, be associated with, and applied to, each of the private logical networks 111-116.

Figure 2:
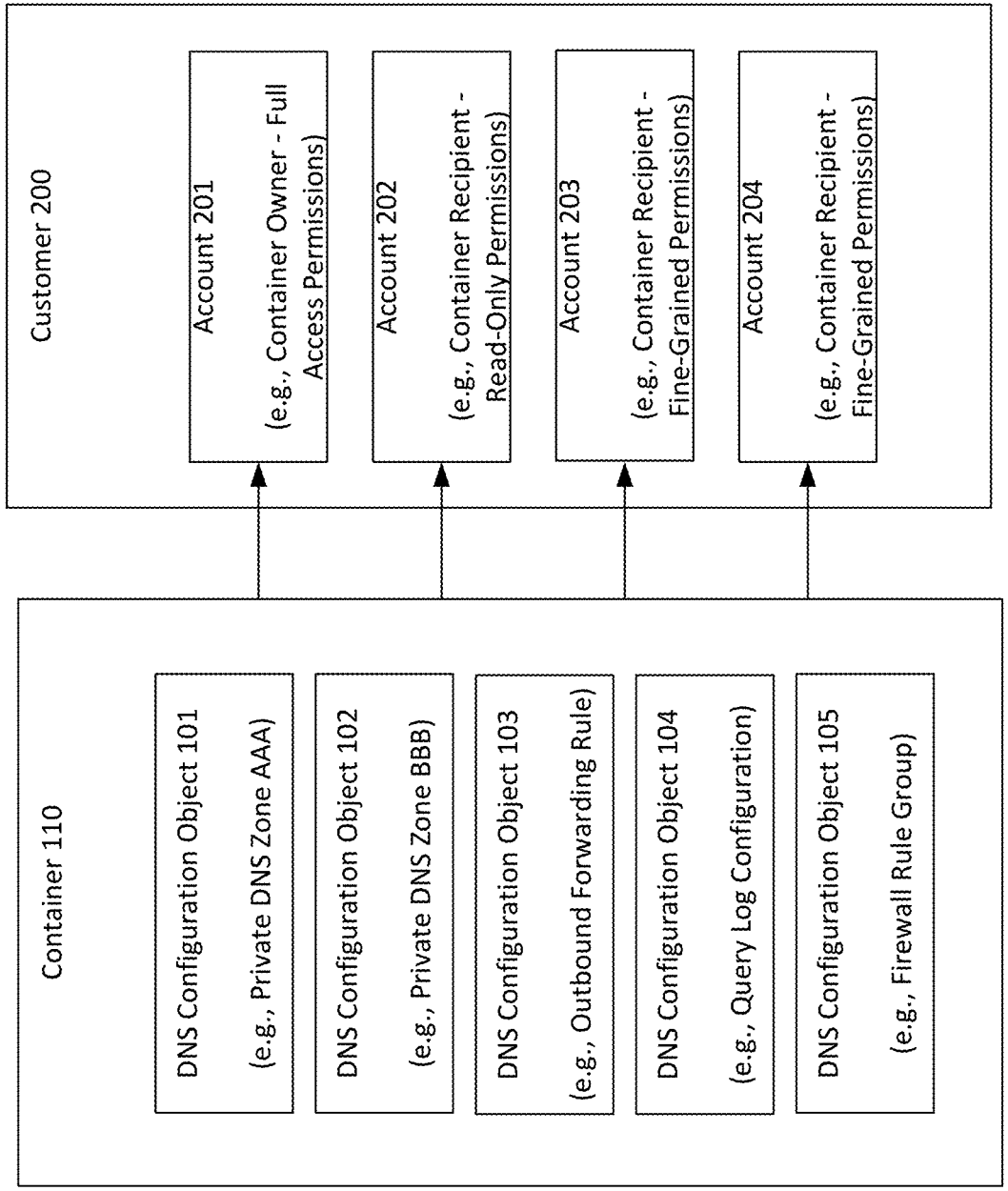
FIG. 2 is a diagram illustrating example cross-account container sharing that may be used in accordance with the present disclosure.

In some examples, the container 110 may be shared across (and optionally modified by) multiple customer accounts. Modifying the container may include, for example, adding DNS configuration objects to the container 110, removing DNS configuration objects from the container 110, or otherwise modifying the container 110 and/or the DNS configuration objects included therein. Referring now to FIG. 2, an example is shown in which a customer 200 of a multi-tenant computing service provider has created accounts 201-204. In the example of FIG. 2, container 110 is shared across accounts 201-204. Additionally, in the example of FIG. 2, different permissions are assigned to different accounts 201-204, thereby limiting changes to the container that may be made by each account 201-204. Specifically, as shown in FIG. 2, account 201 may be assigned full access to the container 110, account 202 may be assigned read-only access to the container 110. Additionally, accounts 203 and 204 may be assigned fine-grained permissions for accessing and modifying container 110. As also shown in FIG. 2, account 201 may be the owner of container 110, which may be the account that creates the container 110, such as a network administrator. In some examples, by default, only the owner of the container 110 may be authorized to modify DNS configuration objects 101-105 within the container 110. However, the owner may be authorized to set permissions for each recipient of container 110, such as to optionally allow those recipients to make changes to the container 110 if desired.

In some examples, fine-grained permissions may be used to specify DNS names for which child accounts are permitted, and/or not permitted, to add private DNS zones and other DNS configuration objects to the container 110. As a specific example, fine-grained permissions may be used to allow members of a given business group to add, to the container, private DNS zones only for subdomains associated with that business group. For example, account 203 may correspond to a first business group associated with a first subdomain of a domain associated with customer 200. The permissions for account 203 may allow account 203 to add, to the container 110, private DNS zones only for the first subdomain. Additionally, account 204 may correspond to a second business group associated with a second subdomain of the same domain. The permissions for account 204 may allow account 204 to add, to the container 110, private DNS zones only for the second subdomain. Furthermore, permissions may also be used to control private DNS zones added to the container so that customer 200 can't add multiple private DNS zones with overlapping namespaces, which could cause DNS resolution conflicts.

Figure 3:
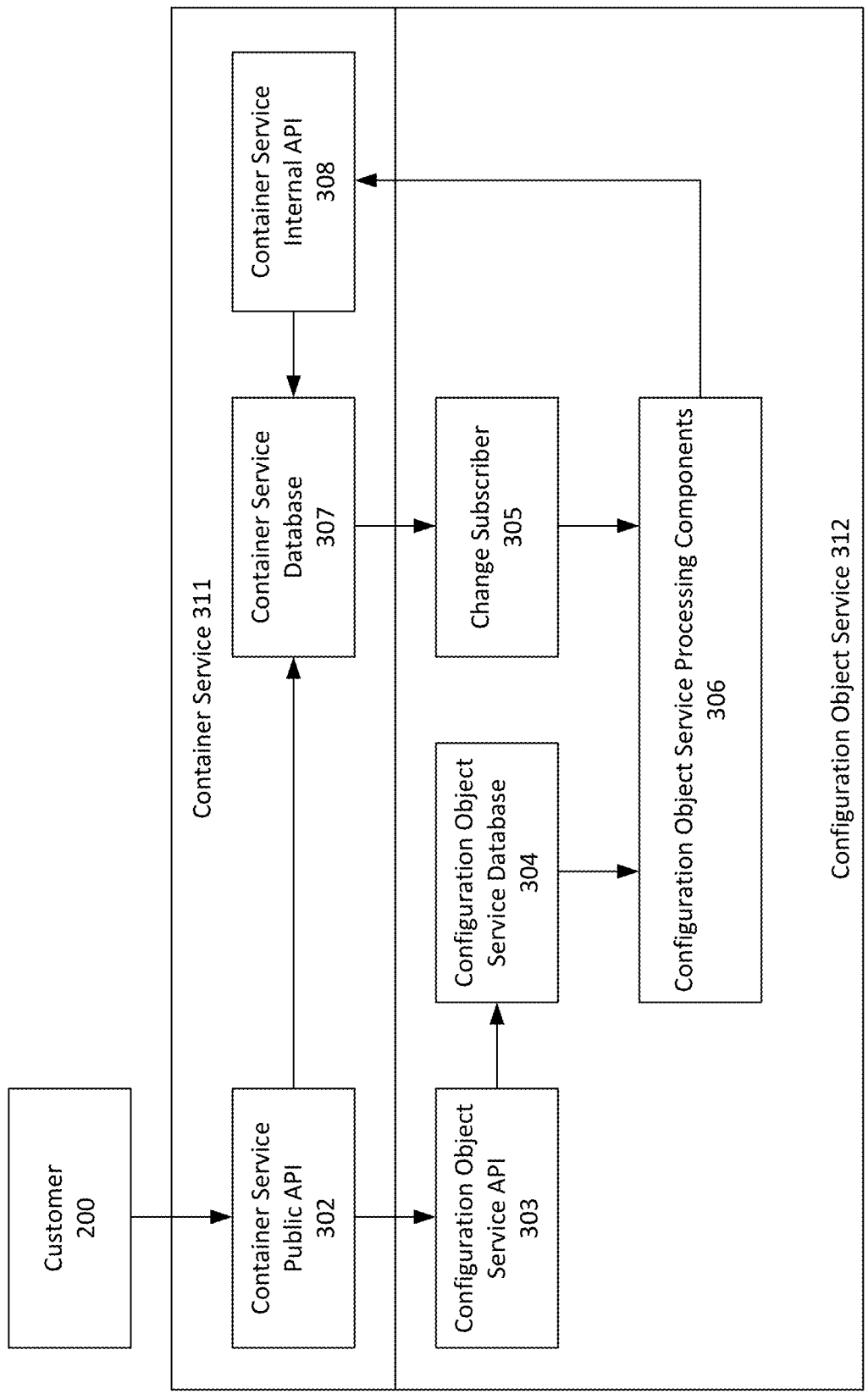
FIG. 3 is a diagram illustrating an example association management system that may be used in accordance with the present disclosure.

FIG. 3 is a diagram illustrating an example association management system that may be used in accordance with the present disclosure. As shown, the system of FIG. 3 includes a container service 311 and a configuration object service 312. The container service 312 may generally perform operations related to management of container 110. The configuration object service 312 may generally perform operations related to management of one or more types of DNS configuration objects. It is noted that, in some examples, the types of DNS configuration objects that may be included in a container may be managed by a plurality of different instances of configuration object service 312. For example, private DNS zones could be managed by a first instance of configuration object service 312 that manages private DNS zones, while firewall rule groups could be managed by a second instance of configuration object service 312 that manages firewall rule groups.

When customer 200 wishes to add a DNS configuration object to container 110, the customer 200 may issue an application programming interface (API) call to container service public API 302 to request adding of the configuration object to the container 110. This customer-issued API call may include information about the DNS configuration object that the customer 200 is requesting to add to the container 110, such as the type of DNS configuration object, a name and/or identifier for the DNS configuration object, etc. The container service 311 may then process this customer-issued API call by, in turn, issuing a second API call to the configuration object service API 303. The second API call may, in turn, request adding of the of the DNS configuration object to the container 110. This second API call may also include information about the DNS configuration object that the customer 200 is requesting to add to the container 110, such as the type of DNS configuration object, a name and/or identifier for the DNS configuration object, etc. It is noted that this second API call may be issued to the respective instance of configuration object service 312 that manages the type of DNS configuration object that the customer 200 is requesting to add to the container 110.

Upon receiving the second API call, the configuration object service 312 may validate that the requested DNS configuration object exists. The configuration object service 312 may also validate that the requested DNS configuration object will not conflict with another DNS configuration object that is already included in the container 110 (e.g., private DNS zones with overlapping namespaces, etc.). If the requested DNS configuration object fails these validations, then the requested DNS configuration object may not be added to the container 110. In some examples, when the requested DNS configuration object fails these validations, an error message may be returned to customer 200, for example indicating that the requested DNS configuration object does not exist or would result in a conflict. By contrast, if the requested DNS configuration object passes these validations, then the configuration object service 312 may create a record of an association between the requested DNS configuration object and the container 110. This record may then be saved in configuration object service database 304.

By contrast, when customer 200 wishes to remove a DNS configuration object from container 110, the customer 200 may issue an API call to container service public API 302 to request removal of the DNS configuration object from the container 110. This customer-issued API call may include information about the DNS configuration object that the customer 200 is requesting to remove from the container 110, such as the type of DNS configuration object, a name and/or identifier for the DNS configuration object, etc. The container service 311 may then process this customer-issued API call by, in turn, issuing a second API call to the configuration object service API 303. The second API call may, in turn, request removal of the of the DNS configuration object from the container 110. This second API call may also include information about the DNS configuration object that the customer 200 is requesting to remover from the container 110, such as the type of DNS configuration object, a name and/or identifier for the DNS configuration object, etc. It is noted that this second API call may be issued to the respective instance of configuration object service 312 that manages the type of DNS configuration object that the customer 200 is requesting to remove from the container 110.

Upon receiving the second API call, the configuration object service 312 may validate that the requested DNS configuration object exists. If the requested DNS configuration object fails this validation, then the requested DNS configuration object may not be removed from the container 110 (i.e., because the DNS configuration object doesn't exist). An error message may be returned to customer 200 indicating that the requested DNS configuration object doesn't exist. By contrast, if the requested DNS configuration object passes this validation, then the configuration object service 312 may delete, from the configuration object service database 304, a record of an association between the requested DNS configuration object and the container 110.

Additionally, when customer 200 wishes to associate container 110 with a private logical network, the customer 200 may issue an API call to container service public API 302 to request association of the container 110 with the private logical network. The container service 311 may then process this customer-issued API call by, in turn, creating a record of the association between container 110 and the requested private logical network. This record may then be saved in container service database 307. The record may be initially assigned a status of "updating" to indicate that the association is in the process of being propagated to instances of configuration object service 312.

As shown in FIG. 3, change subscriber 305 of configuration object service 312 may subscribe to receive indications of changes that are made to container service database 307. These changes may include additions, to the container service database 307, of new records of associations between the container 110 and private logical networks. Thus, when the record of the association between container 110 and the requested private logical network is stored in container service database 307, indications of this association may be sent to change subscriber 305 for each instance of the configuration object service 312 (i.e., to ensure that each of the instance of the configuration object service 312 is properly notified of the new association between container 110 and the requested private logical network).

The indication of the association between the container 110 and the requested private logical network may then be obtained by configuration object service processing components 306. In addition to obtaining the indication of the association between the container 110 and the requested private logical network, the configuration object service processing components 306 may also obtain, from configuration object service database 304, stored records of associations between the container 110 and DNS configuration objects that are managed by that instance of the configuration object service 312. Using this obtained information, the configuration object service processing components 306 are able to determine which DNS configuration objects are to be applied to the requested private logical network. Upon obtaining this information and performing any related propagation operations, the configuration object service processing components 306 may confirm the receipt and propagation of this information back to container service 311 via the container service internal API 308.

The operations described above may be performed by each instance of the configuration object service 312, and each instance of the configuration object service 312 may confirm the receipt and propagation of the respective information back to container service 311 via the container service internal API 308. Once the container service 311 has received a respective confirmation from each instance of the configuration object service 312, the record of the association between the container 110 and the requested private logical network, which is stored in container service database 307, may have its status changed from "updating" to "complete", thereby indicating that the association has been propagated to each instance of the configuration object service 312

Additionally, when customer 200 wishes to disassociate container 110 from a private logical network, the customer 200 may issue an API call to container service public API 302 to request disassociation of the container 110 from the private logical network. The container service 311 may then process this customer-issued API call by, in turn, locating, within the container service database 307, a record of the association between container 110 and the requested private logical network. The container service may then change a status the located record to "deleting" to indicate that the disassociation is in the process of being propagated to instances of configuration object service 312.

As shown in FIG. 3, change subscriber 305 of configuration object service 312 may subscribe to receive indications of changes that are made to container service database 307. These changes may include deletions, from the container service database 307, of records of associations between the container 110 and private logical networks. Thus, when the status of the record of the association between container 110 and the requested private logical network is changed to "deleting" in container service database 307, indications of the disassociation may be sent to change subscriber 305 for each of the instance of the configuration object service 312 (i.e., to ensure that each of the instance of the configuration object service 312 is properly notified of the disassociation between container 110 and the requested private logical network).

The indication of the disassociation between the container 110 and the requested private logical network may then be obtained by configuration object service processing components 306. In addition to obtaining the indication of the disassociation between the container 110 and the requested private logical network, the configuration object service processing components 306 may also obtain, from configuration object service database 304, stored records of associations between the container 110 and DNS configuration objects that are managed by that instance of the configuration object service 312. Using this obtained information, the configuration object service processing components 306 are able to determine which DNS configuration objects are to be disassociated from the requested private logical network. Upon obtaining this information and performing any related propagation operations, the configuration object service processing components 306 may confirm the receipt and propagation of this information back to container service 311 via the container service internal API 308.

The operations described above may be performed by each instance of the configuration object service 312, and each instance of the configuration object service 312 may confirm the receipt and propagation of the respective information back to container service 311 via the container service internal API 308. Once the container service 311 has received a respective confirmation from each instance of the configuration object service 312, the record of the association between the container 110 and the requested private logical network may be deleted from the container service database 307.

Furthermore, when customer 200 wishes to delete container 110, the customer 200 may issue an API call to container service public API 302 to request deletion of the container 110. The container service 311 may then process this customer-issued API call by, in turn, locating a record of the existence of container 110 in the container service database 307. This record may be created upon the initial creation of the container 110. Upon locating this record, the container service 311 may mark the record as "deleting" to indicate that the deletion of the container 110 is in the process of being propagated to instances of configuration object service 312.

As shown in FIG. 3, change subscriber 305 of configuration object service 312 may subscribe to receive indications of changes that are made to container service database 307. These changes may include deletions, from the container service database 307, of records of the existence of container 110. Thus, when the status of record of the existence of container 110 is changed to "deleting" in container service database 307, indications of the deletion may be sent to change subscriber 305 for each of the instance of the configuration object service 312 (i.e., to ensure that each of the instance of the configuration object service 312 is properly notified of the deletion of container 110).

The indication of the deletion of the container 110 may then be obtained by configuration object service processing components 306. The configuration object service processing components 306 may then delete, from configuration object service database 304, stored records of associations between the container 110 and DNS configuration objects that are managed by that instance of the configuration object service 312. The configuration object service processing components 306 may then confirm the propagation of the deletion back to container service 311 via the container service internal API 308.

The operations described above may be performed by each instance of the configuration object service 312, and each instance of the configuration object service 312 may confirm the propagation of the deletion back to container service 311 via the container service internal API 308. Once the container service 311 has received a respective confirmation from each instance of the configuration object service 312, the record of the existence of the container 110 may be deleted from the container service database 307.

Figure 4:
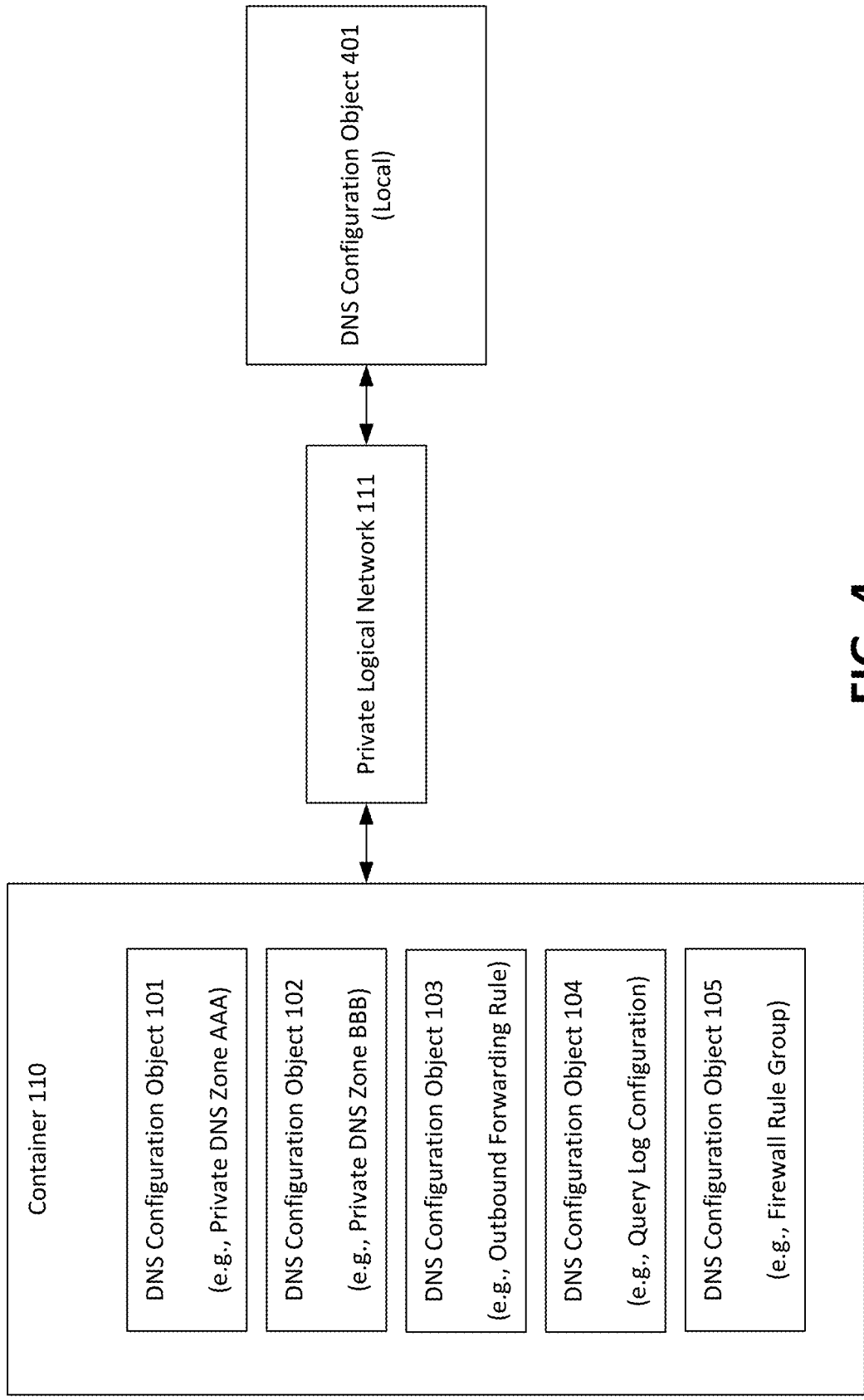
FIG. 4 is a diagram illustrating an example combination of container and local associations that may be used in accordance with the present disclosure.

In some examples, containers may optionally be used in combination with local associations, which are traditional direct associations between DNS configuration objects and private logical networks. Referring now to FIG. 4, an example is shown in which private logical network 111 is associated with both container 110 (i.e., via a container association) and with DNS configuration object 401 (i.e., via a local association). This may allow customers to create private logical network-specific configurations while still inheriting from a common shared DNS configuration collection in a container. Moreover, in some examples, the computing service provider may employ a set of priorities for responding to requests that involve a conflict between a container configuration and a local configuration. For example, in some cases, when such a conflict occurs, the configuration (i.e., container or local) with the most specific applicable rule may be given priority. If both configurations are equally specific, then the local configuration may generally be given priority over the container configuration. These priorities may allow customers that are currently using local associations to gradually add, and migrate to, container associations without the fear that the container associations will result in errors or unexpected behaviors. For example, after associating a container to a private logical network, a customer may gradually disassociate each local configuration object one-by-one and test to verify the container provides expected behavior (e.g., an intended DNS resolution is provided for the private logical network). This approach allows the customer to immediately rollback the container migration if unexpected behavior is encountered.

Referring now to FIG. 5, a rule priorities table 500 is shown, which illustrates some example priorities for choosing whether to apply a container private DNS zone rule or a local private DNS zone rule. As shown, rule priorities table 500 includes a DNS query column 511, a container private DNS zone rule column 512, a local private DNS zone rule column 513, and an evaluated rule column 514. DNS query column 511 shows some example DNS queries that may be issued. Container private DNS zone rule column 512 shows example domains and/or subdomains for which a container private DNS zone rule has been specified (i.e., via association of a container to a private logical network). Local private DNS zone rule column 513 shows example domains and/or subdomains for which a local private DNS zone rule has been specified (i.e., via a local association of a configuration object to the same private logical network). Evaluated rule column 514 shows, for each row; the rule (i.e., container or local) that is given priority and is evaluated.

For example, the top row of DNS query column 511 shows a scenario in which a query foo.example is received. As illustrated in the top rows of container private DNS zone rule column 512 and local private DNS zone rule column 513, both the container private DNS zone and the local private DNS zone include rules for the domain foo.example. Accordingly, in this example, because the local configuration is given priority over the container configuration when both configurations are equally specific, the local private DNS rule (as opposed to the container private DNS rule) is evaluated and applied.

As another example, the second row of DNS query column 511 shows a scenario in which a query specific.foo.example is received. As illustrated in the second row of container private DNS zone rule column 512, the container configuration has a rule for the specific.foo.example subdomain. By contrast, as illustrated in the second row of local private DNS zone rule column 513, the local configuration has a rule for the foo.example domain, but not for the specific.foo.example subdomain. Thus, in this example, the container configuration is more specific than the local configuration. Accordingly, in this example, because the configuration with the most specific applicable rule is given priority, the container private DNS rule (as opposed to the local private DNS rule) is evaluated and applied.

As another example, the third row of DNS query column 511 shows another scenario in which a query specific.foo.example is received. As illustrated in the third row of container private DNS zone rule column 512, the container configuration does not have a rule for the foo.example domain and/or the specific.foo.example subdomain. By contrast, as illustrated in the third row of local private DNS zone rule column 513, the local configuration has a rule for the specific.foo.example subdomain. Thus, in this example, the local configuration is more specific than the container configuration. Accordingly, in this example, because the configuration with the most specific applicable rule is given priority, the local private DNS rule (as opposed to the container private DNS rule) is evaluated and applied.

It is noted that, while the examples shown in FIG. 5 relate to a domain and a subdomain, the logic (e.g., conflict resolution priorities) that are shown in FIG. 5 and described herein may be applied to a variety of other resources. Moreover, in some examples, different conflict resolution priority rules could optionally be applied to different types of configuration objects. For example, a first priority rule (e.g., assign priority to the local configuration) could be assigned to a first type of DNS configuration objects, while a second priority rule (e.g., assign priority to the container configuration) could be assigned to a second type of DNS configuration objects.

Figure 6:
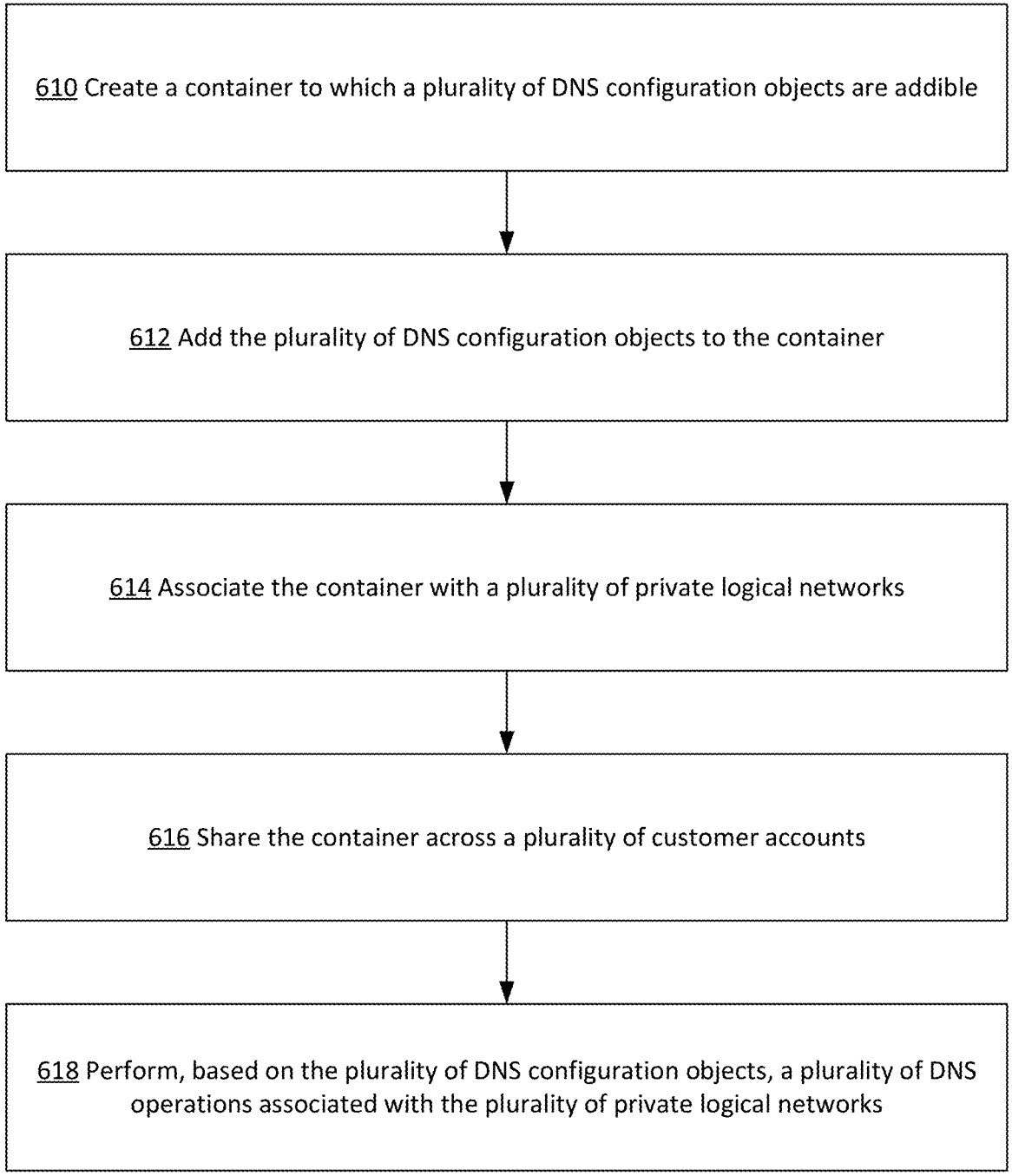
FIG. 6 is a flowchart illustrating an example container-based association process that may be used in accordance with the present disclosure.

FIG. 6 is a flowchart illustrating an example container-based association process that may be used in accordance with the present disclosure. Any, or all, of operations 610-618 of FIG. 6 may be performed by a multi-tenant computing service provider. The process of FIG. 6 is initiated at operation 610, at which a container is created to which a plurality of domain name system (DNS) configuration objects are addible (i.e., are capable of being added). The container may allow storage of the plurality of DNS configuration objects that are added to the container. The container may be created based on one or more first requests from a customer of a multi-tenant computing service provider. In some examples, creation of a container may include creating an instance of a data object corresponding to the container type and assigning a name and/or other identifier to the container. The name and/or other identifier may allow the container to be referenced and distinguished from other containers (e.g., uniquely identified), such as other containers owned by the same customer and/or other customers of the multi-tenant computing service provider. In some examples, a user interface may be provided that may include one or more controls that allow a customer to request creation of the container. In one specific example, a customer may navigate to a container-related page of the user interface and select a configure container button (or other similar control) to request creation of the container. The customer may then be prompted to enter a name and/or other identifier for the container, which may then be assigned to the container. As described above, the plurality of DNS configuration objects may include, for example, private DNS zones, outbound forwarding rules, DNS query log configurations, and/or firewall rule groups At operation 612, the plurality of DNS configuration objects are added to the container. The plurality of DNS configuration objects may be added to the container based on one or more second requests from the customer. Adding the plurality of DNS configuration objects to the container may include storing the plurality of DNS configuration objects in the container. Furthermore, adding a DNS configuration object to the container may additionally, or alternatively, include (or may otherwise be associated with) a number of operations described in detail above with reference to FIG. 3. These operations may include receiving, via container service public API 302, a customer-issued API call to request adding of the configuration object to the container 110. These operations may also include issuing a second API call to the configuration object service API 303 to request adding of the DNS configuration object to the container 110. These operations may also include validating that the requested DNS configuration object exists and that the requested DNS configuration object will not conflict with another DNS configuration object that is already included in the container 110. These operations may also include creating a record of an association between the requested DNS configuration object and the container 110. These operations may also include saving this record in configuration object service database 304.

It is noted that one or more of the plurality DNS configuration objects may optionally be removed from the container at any time after they are added. Removing a DNS configuration object from a container may include deleting the DNS configuration object from the container. Furthermore, removing a of DNS configuration object from the container may additionally, or alternatively, include (or may otherwise be associated with) a number of operations described in detail above with reference to FIG. 3. These operations may include receiving, via container service public API 302, a customer-issued API call to request removing of the configuration object from the container 110. These operations may also include issuing a second API call to the configuration object service API 303 to request removing of the DNS configuration object from the container 110. These operations may also include validating that the requested DNS configuration object exists. These operations may also include deleting a record of an association between the requested DNS configuration object and the container 110 from configuration object service database 304.

At operation 614, the container is associated with a plurality of private logical networks. The container may be associated with the plurality of private logical networks based on one or more third requests from the customer. As described above, the plurality of private logical networks may be hosted by the multi-tenant computing service provider. As also described above, associating of the container with the plurality of private logical networks may cause the plurality of DNS configuration objects that are added to (e.g., stored in) the container to be applied to the plurality of private logical networks. This means that DNS operations associated with the plurality of private logical networks may be performed in accordance with the plurality of DNS configuration objects. Associating the container with a private logical network may include a number of operations described in detail above with reference to FIG. 3. These operations may include receiving, via container service public API 302, a customer-issued API call to request associating the container with a private logical network. These operations may also include creating and saving a record of the association between container 110 and the requested private logical network in container service database 307. As also described with reference to FIG. 3, an indication of this record may be received by change subscriber 305 for each instance of the configuration object service 312. The indication of the association between the container 110 and the requested private logical network may then be obtained by configuration object service processing components 306. In addition to obtaining the indication of the association between the container 110 and the requested private logical network, the configuration object service processing components 306 may also obtain, from configuration object service database 304, stored records of associations between the container 110 and DNS configuration objects that are managed by that instance of the configuration object service 312. Using this obtained information, the configuration object service processing components 306 are able to determine which DNS configuration objects are to be applied to the requested private logical network.

As described above, in some examples, a local DNS configuration object, which is not included in the container, may be associated with a first private logical network of the plurality of private logical networks. A set of priorities may be employed to resolve conflicts between the container and the local DNS configuration object for the first private logical network. The set of priorities may specify that the local DNS configuration object is granted priority unless the container has an applicable rule that is more specific than the local DNS configuration object. Some examples of how this set of priorities may be applied are described in detail above with reference to FIG. 5.

At operation 616, the container is shared across a plurality of customer accounts (i.e., accounts that belong to the customer). In some examples, the container may be modifiable by two or more of the plurality of accounts. As described above, an owner of the container may assign different levels of permission for accessing and modifying the container to different accounts. In this manner, permissions may be used to control whether, and to what extents, the container may be modified by different customer accounts. For example, the plurality of accounts may include a first account and a second account, and a given permission for modifying the container may be assigned to the first account but not assigned to the second account. For example, some accounts may be assigned full access to the container, while other accounts may be assigned read-only access. Moreover, in some cases, fine-grained permissions may be used for one or more accounts. For example, fine-grained permissions may be used to specify DNS names for which child accounts are permitted, and/or not permitted, to add private DNS zones and other DNS configuration objects to the container. As a specific example, fine-grained permissions may be used to allow members of a given business group to add, to the container, private DNS zones only for subdomains associated with that business group. Furthermore, two or more private DNS zones with overlapping namespaces, which could cause DNS resolution conflicts, may be prohibited from being added to the container.

At operation 618, a plurality of DNS operations associated with the plurality of private logical networks are performed based on the plurality of DNS configuration objects. In some examples, at least one of the plurality of DNS operations may be performed in association with each of the plurality of private logical networks. The plurality of DNS operations may include DNS query resolution, DNS query outbound forwarding, configuring a query log, and/or configuring a firewall. For example, in some cases, a DNS query directed to one of the plurality of private logical networks may be resolved in accordance with a private DNS zone that may be included in the container. As another example, a DNS query may be forwarded from one of the plurality of private logical networks to another customer network in accordance with an outbound forwarding rule that may be included in the container. As another example, a query log associated with one or more of the private logical networks may be configured in accordance with a query log configuration that may be included in the container. As yet another example, a firewall associated with one or more of the private logical networks may be configured in accordance with a firewall rule group that may be included in the container.

Each of the above-described operations may be performed because the plurality of DNS configuration objects included in the container are applied to each of the plurality of private logical networks with which the container is associated. This means that DNS operations associated with the plurality of private logical networks may be performed in accordance with the plurality of DNS configuration objects. For example, using techniques such as those described above with reference to FIG. 3, the configuration object service may create and store associations between a DNS configuration object within the container and each private logical network with which the container is associated. Based on these associations, the configuration object service may apply the DNS configuration object to a private logical network with which the container is associated, such as to perform a DNS operation for the private logical network in accordance with the DNS configuration object.

In some examples, an existing network configuration of a customer may be modeled to a container. For example, in some cases, when a computing service provider begins to support the use of containers as described herein, it may be desirable to find ways to efficiently onboard a customer's pre-existing (i.e., pre-container) network configuration into a container-based configuration. In some examples, the computing service provider may assist the customer in this process, such as by analyzing the customer's network configuration to identify core settings that are widely used across a customer's networks. These core configurations may then be added to, and modeled in, the container. This approach may be particularly advantageous for customers with large and complex configurations. In some examples, this modeling approach may be performed when use of a container is initiated, and additional modifications (e.g., adding and removing of DNS configuration objects) may optionally be made to the container during subsequent usage of the container.

Figure 7:
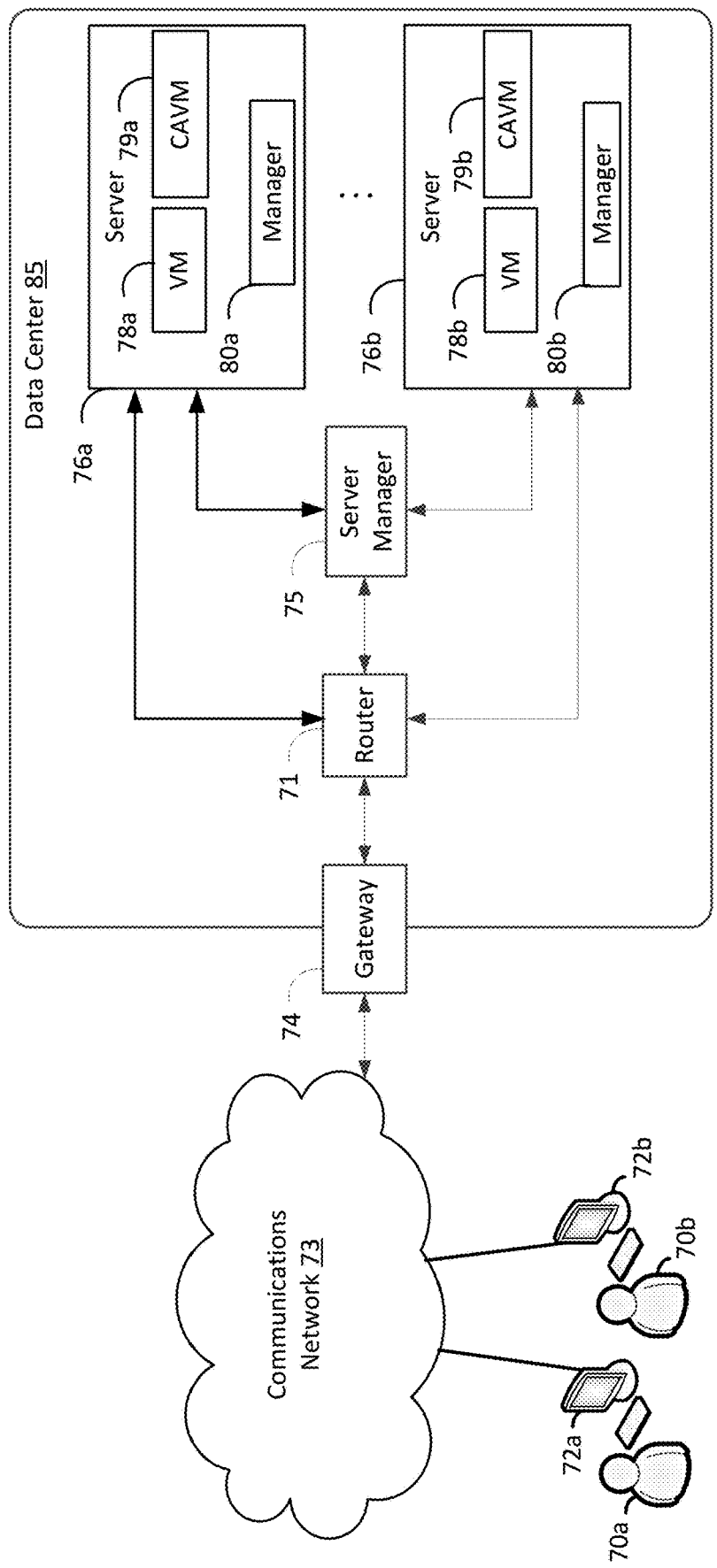
FIG. 7 is a diagram illustrating an example system for transmitting and providing data that may be used in accordance with the present disclosure.

An example system for transmitting and providing data will now be described in detail. In particular, FIG. 7 illustrates an example computing environment in which the embodiments described herein may be implemented. FIG. 7 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-b (which may be referred herein singularly as virtual machine instance 78 or in the plural as virtual machine instances 78). In this example, the resources also include container association virtual machines (CAVM's) 79a-b, which are virtual machines that are configured to execute any, or all, of the container-based techniques for associating DNS configuration objects with private logical networks described above.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 7, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 7 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 7, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 7, a server manager 75 is also employed to at least in part direct various communications to, from and/or between servers 76a and 76b. While FIG. 7 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 85 described in FIG. 7 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 8:
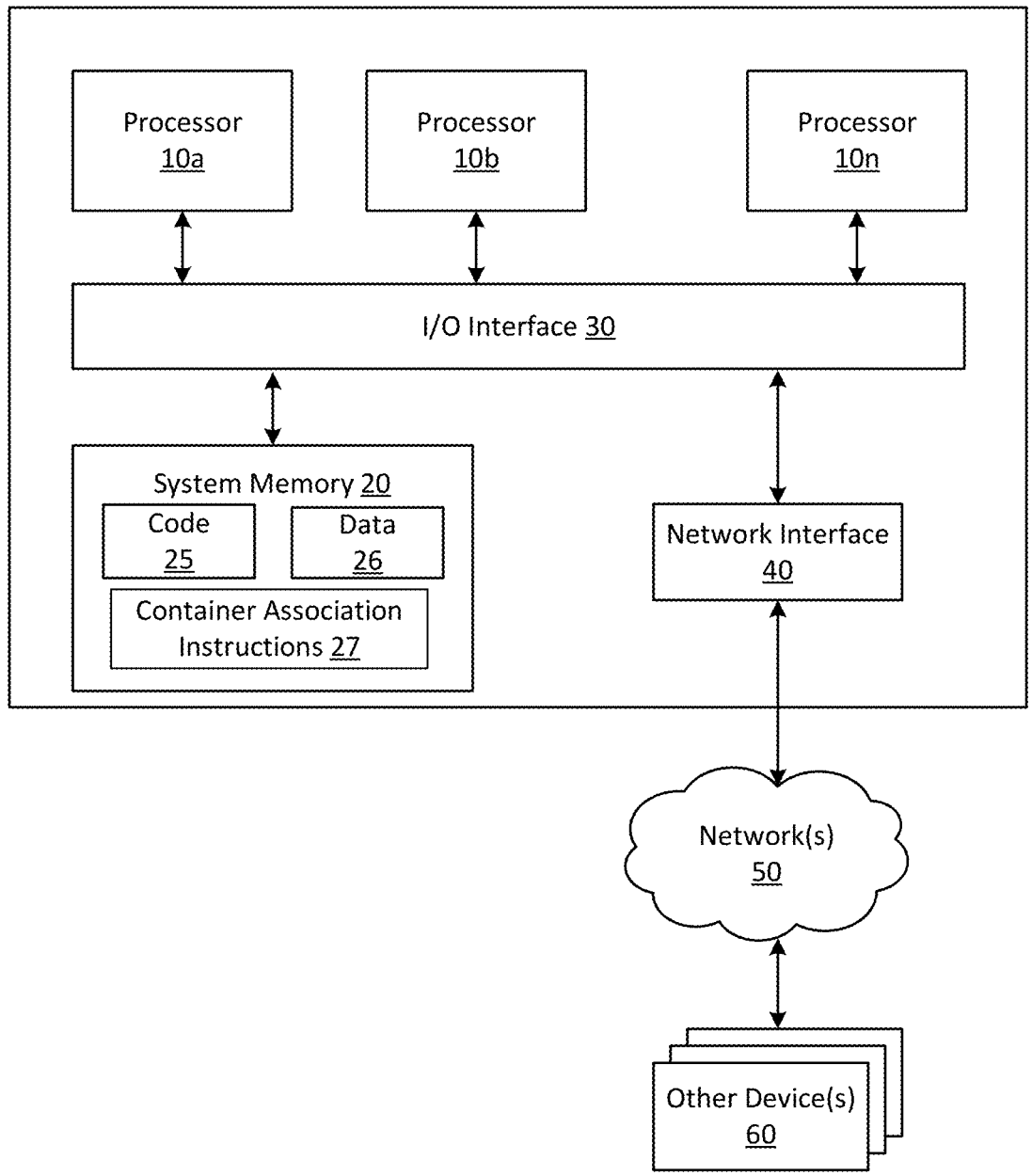
FIG. 8 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 8 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26. Additionally, in this example, system memory 20 includes container association instructions 27, which are instructions for executing any, or all, of the container-based techniques for associating DNS configuration objects with private logical networks described above.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations: in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability container of a resource instance is intended to be independent of the availability container of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms: furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:
   one or more processors; and
   one or more memories having stored therein instructions that, upon execution by the one or more processors, cause the computing system to perform computing operations comprising:
   creating, based on one or more first requests from a customer of a multi-tenant computing service provider, a container to which a plurality of domain name system (DNS) configuration objects are addible, wherein the plurality of DNS configuration objects comprise at least one of private DNS zones, outbound forwarding rules, DNS query log configurations, and firewall rule groups;
   adding, based on one or more second requests from the customer, the plurality of DNS configuration objects to the container, wherein the adding of the plurality of DNS configuration objects to the container comprises storing the plurality of DNS configuration objects in the container;
   associating, based on one or more third requests from the customer, the container with a plurality of private logical networks, wherein the plurality of private logical networks are hosted by the multi-tenant computing service provider;
   sharing the container across a plurality of accounts that belong to the customer; and
   performing, based on the plurality of DNS configuration objects, a plurality of DNS operations associated with the plurality of private logical networks, wherein the plurality of DNS operations comprise at least one of DNS query resolution, DNS query outbound forwarding, configuring a query log, or configuring a firewall.

2. The computing system of claim 1, wherein the container is modifiable by two or more of the plurality of accounts.

3. The computing system of claim 1, further comprising associating a local DNS configuration object, which is not included in the container, with a first private logical network of the plurality of private logical networks.

4. The computing system of claim 3, wherein a set of priorities is employed to resolve conflicts between the container and the local DNS configuration object.

5. The computing system of claim 1, wherein the associating of the container with the plurality of private logical networks causes the plurality of DNS configuration objects to be applied to the plurality of private logical networks.

6. The computing system of claim 4, wherein the set of priorities specifies that the local DNS configuration object is granted priority unless the container has an applicable rule that is more specific than the local DNS configuration object.

7. A computer-implemented method comprising:
   creating, based on one or more first requests from a customer of a multi-tenant computing service provider, a container to which a plurality of domain name system (DNS) configuration objects are addible, wherein the plurality of DNS configuration objects comprise at least one of private DNS zones, outbound forwarding rules, DNS query log configurations, and firewall rule groups;
   adding, based on one or more second requests from the customer, the plurality of DNS configuration objects to the container;
   associating, based on one or more third requests from the customer, the container with a plurality of private logical networks, wherein the plurality of private logical networks are hosted by the multi-tenant computing service provider;
   sharing the container across a plurality of accounts that belong to the customer; and
   performing, based on the plurality of DNS configuration objects, a plurality of DNS operations associated with the plurality of private logical networks, wherein the plurality of DNS operations comprise at least one of DNS query resolution, DNS query outbound forwarding, configuring a query log, or configuring a firewall.

8. The computer-implemented method of claim 7, wherein the plurality of accounts comprises a first account and a second account, and wherein a permission for modifying the container is assigned to the first account but is not assigned to the second account.

9. The computer-implemented method of claim 7, wherein the adding the plurality of DNS configuration objects to the container comprises storing the plurality of DNS configuration objects in the container.

10. The computer-implemented method of claim 7, wherein an existing network configuration of the customer is modeled to the container.

11. The computer-implemented method of claim 7, further comprising associating a local DNS configuration object, which is not included in the container, with a first private logical network of the plurality of private logical networks.

12. The computer-implemented method of claim 11, further comprising employing a set of priorities to resolve conflicts between the container and the local DNS configuration object.

13. The computer-implemented method of claim 12, wherein the set of priorities specifies that the local DNS configuration object is granted priority unless the container has an applicable rule that is more specific than the local DNS configuration object.

14. The computer-implemented method of claim 7, wherein the associating of the container with the plurality of private logical networks causes the plurality of DNS configuration objects to be applied to the plurality of private logical networks.

15. The computer-implemented method of claim 7, further comprising prohibiting two or more private DNS zones with overlapping namespaces from being added to the container.

16. One or more non-transitory computer-readable storage media having stored thereon computing instructions that, upon execution by one or more computing devices, cause the one or more computing devices to perform computing operations comprising:
   creating, based on one or more first requests from a customer of a multi-tenant computing service provider, a container to which a plurality of domain name system (DNS) configuration objects are addible, wherein the plurality of DNS configuration objects comprise at least one of private DNS zones, outbound forwarding rules, DNS query log configurations, and firewall rule groups;
   adding, based on one or more second requests from the customer, the plurality of DNS configuration objects to the container;
   associating, based on one or more third requests from the customer, the container with a plurality of private logical networks, wherein the plurality of private logical networks are hosted by the multi-tenant computing service provider;
   performing, based on the plurality of DNS configuration objects, a plurality of DNS operations associated with the plurality of private logical networks, wherein the plurality of DNS operations comprise at least one of DNS query resolution, DNS query outbound forwarding, configuring a query log, or configuring a firewall;
   associating a local DNS configuration object, which is not included in the container, with a first private logical network of the plurality of private logical networks; and
   employing a set of priorities to resolve conflicts between the container and the local DNS configuration object.

17. The one or more non-transitory computer-readable storage media of claim 16, wherein the computing operations further comprise sharing the container across a plurality of accounts that belong to the customer.

18. The one or more non-transitory computer-readable storage media of claim 16, wherein the set of priorities specifies that the local DNS configuration object is granted priority unless the container has an applicable rule that is more specific than the local DNS configuration object.

19. The one or more non-transitory computer-readable storage media of claim 17, wherein the plurality of accounts comprises a first account and a second account, and wherein a permission for modifying the container is assigned to the first account but is not assigned to the second account.

20. The one or more non-transitory computer-readable storage media of claim 16, wherein the adding the plurality of DNS configuration objects to the container comprises storing the plurality of DNS configuration objects in the container.

* * * * *